US011080729B2

(12) United States Patent
Carsanaro et al.

(10) Patent No.: US 11,080,729 B2
(45) Date of Patent: Aug. 3, 2021

(54) SURVEY ADMINISTRATION SYSTEM AND METHODS

(71) Applicants: Joseph Anthony Carsanaro, Winter Park, FL (US); Christopher Lawrence Mills, Chapel Hill, NC (US)

(72) Inventors: Joseph Anthony Carsanaro, Winter Park, FL (US); Christopher Lawrence Mills, Chapel Hill, NC (US)

( * ) Notice: Subject to any disclaimer, the term of this patent is extended or adjusted under 35 U.S.C. 154(b) by 1268 days.

(21) Appl. No.: 15/043,734

(22) Filed: Feb. 15, 2016

(65) Prior Publication Data

US 2016/0162916 A1   Jun. 9, 2016

Related U.S. Application Data

(63) Continuation of application No. 13/828,730, filed on Mar. 14, 2013, now Pat. No. 9,262,768, which is a (Continued)

(30) Foreign Application Priority Data

Jun. 10, 2011   (KR) .................. 10-2011-0056395

(51) Int. Cl.
*G06F 3/0481* (2013.01)
*G06Q 30/02* (2012.01)
(Continued)

(52) U.S. Cl.
CPC ....... *G06Q 30/0203* (2013.01); *G06F 3/0481* (2013.01); *G06F 3/04842* (2013.01);
(Continued)

(58) Field of Classification Search
CPC ................................... G06Q 30/0203
See application file for complete search history.

(56) References Cited

U.S. PATENT DOCUMENTS 6,317,718 B1   11/2001   Fano
6,324,519 B1 *  11/2001   Eldering ............... G06Q 30/02
                                                      705/14.65
(Continued)

FOREIGN PATENT DOCUMENTS

JP        2007034772      8/2007
KR      1020050043917     9/2006

OTHER PUBLICATIONS

Cao, MEDYM: Match-Early with Dynamic Multicast for Content-Based Publish-Subscribe Networks, 2005, Middleware, pp. 292-313 (Year: 2005).*

*Primary Examiner* — Renae Feacher
*Assistant Examiner* — Vk Purl
(74) *Attorney, Agent, or Firm* — Neo IP

(57) ABSTRACT

A system for determining preference, including a client device with feedback controls, a server and addressable URIs; the device and server in communication over an electronic network and the URIs' content retrievable over the network; the server automatically receiving and storing ratings, tracking URIs, using ratings to create a preference model for URIs, and using the preference model to suggest URIs; the stored ratings include a record having a rated item URI, a rater having a unique identification, a rating value provided by the rater, and at least one metadatum for creating subsets of ratings. Also, a method for automatically creating a chimeric preference vector, the method steps including identifying a multiplicity of datasets of rated items; automatically combining the datasets to form a combined dataset; automatically identifying ratings collisions; treating ratings collisions to form a data subset; and generating a chimeric preference vector based on the data subset.

20 Claims, 14 Drawing Sheets

Related U.S. Application Data continuation of application No. 13/491,978, filed on Jun. 8, 2012, now Pat. No. 8,965,780.

(51) Int. Cl.
  *G06F 3/0484* (2013.01)
  *G06Q 50/00* (2012.01)

(52) U.S. Cl.
  CPC ..... *G06F 3/04847* (2013.01); *G06Q 30/0201* (2013.01); *G06Q 30/0207* (2013.01); *G06Q 50/01* (2013.01)

(56) References Cited

U.S. PATENT DOCUMENTS

| | | | |
|---|---|---|---|
| 6,370,513 B1 | 4/2002 | Kolawa et al. | |
| 6,993,495 B2 | 1/2006 | Smith et al. | |
| 7,403,910 B1* | 7/2008 | Hastings | G06Q 30/02 705/26.1 |
| 8,346,781 B1* | 1/2013 | Cornelius | G06Q 30/0241 434/353 |
| 8,489,452 B1* | 7/2013 | Warner | G06Q 30/0233 705/14.38 |
| 8,600,790 B1* | 12/2013 | Peacock, III | G06Q 30/0203 705/7.11 |
| 2003/0014324 A1* | 1/2003 | Donovan | A61K 8/02 705/26.43 |
| 2005/0071219 A1 | 3/2005 | Kahlert et al. | |
| 2007/0226045 A1 | 9/2007 | Chen | |
| 2008/0155589 A1* | 6/2008 | McKinnon | G06Q 30/02 725/34 |
| 2008/0201201 A1* | 8/2008 | Pousti | G06F 8/60 705/7.29 |
| 2010/0017289 A1* | 1/2010 | Sah | G06Q 30/0251 705/14.49 |
| 2010/0042577 A1* | 2/2010 | Rinearson | G06Q 10/10 706/56 |
| 2010/0121807 A1* | 5/2010 | Perrier | G06Q 30/02 706/47 |
| 2010/0324993 A1* | 12/2010 | Kacholia | G06Q 30/00 705/14.54 |
| 2011/0161164 A1 | 6/2011 | Anderson | |
| 2011/0282724 A1* | 11/2011 | Hwang | G06Q 30/02 705/14.19 |
| 2012/0150611 A1* | 6/2012 | Isaacson | G06Q 30/02 705/14.27 |
| 2012/0173305 A1* | 7/2012 | Bhaskaran | G06Q 30/02 705/7.32 |
| 2013/0046582 A1 | 2/2013 | Ramer et al. | |
| 2014/0222622 A1* | 8/2014 | Du | G06F 16/9535 705/26.63 |

\* cited by examiner web content
browsing pane like / dislike type
survey item multiple choice type
survey item slider type
survey item 1-5 star rating type survey item home work weekend

SURVEY ADMINISTRATION SYSTEM AND METHODS

CROSS-REFERENCE TO RELATED APPLICATIONS

This application is a continuation of U.S. patent application Ser. No. 13/828,730, filed Mar. 14, 2013, which is a continuation of U.S. patent application Ser. No. 13/491,978, filed Jun. 8, 2012, which claims the benefit of Republic of Korea Application No. 1020110056395, Jun. 10, 2011, each of which is hereby incorporated by reference in its entirety.

BACKGROUND OF THE INVENTION

1. Field of the Invention

The present invention relates to online surveying to determine user preferences.

2. Description of the Prior Art

Prior art survey administration approaches and tools in-person, by telephone, hybrid methods (e.g.—using TV, radio, webcast to deliver items and using phones or SMS for submitting responses), self-administered (mail), self-administered (web apps via browsers).

Weaknesses in current approaches and tools include costs, speed, complexity, insufficient psychographic data, ineffective rewards, copyright/trademark infringement, lack of incorporation of social networking, and lack of optimization for mobile devices.

Prior art survey approaches are expensive because they require experts to design the survey and decide whom to target, and require a contract with an existing respondent pool or a recruitment effort to get sufficient respondents. Across current methods, administration costs still increase roughly in-line with the number of respondents required.

In-person administration has high costs per potential respondent contacted. Phone and hybrid methods tend to be cheaper per potential respondent contacted, but convert potential respondents into actual respondents at a lower rate. While self-administered methods tend to be substantially cheaper per potential respondent contacted than in-person, phone, or hybrid methods, they also have substantially lower conversion rates—forcing a much larger number of potential respondents to be contacted to achieve statistically significant response rates.

In-person recruitment is slow but has a relatively high response rate from potential respondents contacted when compared to other methods. By phone recruitment is also slow and requires many potential respondents to be contacted for each completed survey.

Self-administration—in all forms—has an even lower response rate from all potential respondents contacted than supervised methods, and is prone to unpredictable delays in completion for those respondents who do complete the surveys.

Survey design can be complex and difficult, requiring expert assistance. However, even when the survey design is very simple, administering surveys in a supervised context without substantially biasing responses requires domain-specific expertise. Methods of delivering self-administered surveys over broadcast media and or electronic networks can require technical expertise unrelated to survey design or analysis.

Demographic data is required for most surveys. While some surveys still collect the required demographic data from respondents as part of each survey administered, some newer survey administration approaches preserve collected demographic data for respondents. If the data is preserved for a respondent, they do not need to be asked for it again when they take additional surveys in the future. This can reduce the time required to take surveys, and increase response rate amongst repeat respondents.

Stored demographic data for past respondents can also improve the efficiency of recruitment efforts for future surveys with pre-emptive demographic targeting. For example, potential respondents whose demographics are already well represented in responses for a survey already in progress can be excluded from additional recruitment efforts.

With demographic data, there is a basic canon, including age, sex, ethnicity, location, education, profession and income. Once all this is collected, the net benefit of storing more or more detailed demographic information for a respondent drops off. These deeper demographic details may be important for a particular survey, but are unlikely to be broadly useful in recruitment for or analysis of future surveys.

Psychographic—or IAO (Interests, Activities and Opinions)—data is often collected as part of a survey. However, it is usually only collected in a tightly focused area specific to the survey administered. The respondent IAO data is used in the analysis of that survey, but is not stored in a way that associates the responses with the respondent for future reference. The IAO data can thus be considered episodic—which is to say it is only collected and used in the context of a single survey. This omission prevents past responses from being used as an aid in recruitment (psychographic targeting) and or analysis (correlation with past opinions without repeating the questions) for future surveys.

In contrast to demographic data, psychographic data tends to become more broadly useful—particularly for recruitment targeting—the more of it is available. The usual limitation on its collection is that longer surveys tend to have correspondingly lower response rates.

Prior art enticements and rewards tend to be non-dynamic and potentially biasing. Enticements must be revealed during recruitment—prior to survey administration—to influence whether a potential respondent will choose to participate in a survey. Enticements to participate in a survey tend to be generic (e.g. cash equivalents like AmEx gift cards) and uniform. When enticements are non-generic (i.e.—an item or service from an identifiable brand), they risk biasing the survey—both in terms of influencing who will agree to take the surveys and what opinions they might have regarding the brand of the gift or related brands. When enticements are non-uniform, the mechanics of the administration become more complex and the costs per response with current methods tend to rise because more experienced administrators are required for supervised administration methods and more complex automated systems are required for current hybrid and self-administered methods.

However, uniform enticements miss out on opportunities to adjust incentives based on potential or actual respondents matching targeted criteria. Easy-to-recruit demographics can be offered lower value rewards for participation, lowering overall administration costs. Hard-to-recruit demographics can be offered higher value rewards for participation, increasing response rates. Respondents with key demographic, psychographic or social networking characteristics (e.g.—having many friends, having a high propensity for sharing links, liking a particular organization, etc) can be offered "bonus" rewards either prior to survey administration as extra enticements to participate or after having completed a survey to improve their perception of a brand or organization. Conditional bonus rewards could also be offered as an incentive to take additional steps immediately upon survey completion. This allows surveys to be used as a way to camouflage what is essentially a targeted brand promotion message.

Survey construction can be constrained by trademark and or copyright limits on usage of brand-specific images or language. Usage of such content without permission in a printed survey can lead to objections from rights holders. Restrictions on usage of such content on web pages generally fall into three categories based on the method of inclusion and how much that method modifies the context of the content from that in which it was originally offered. Linking (i.e.—providing a hypertext link that can trigger the display of the external content in its original form) is generally permitted without prior permission. Framing (i.e.—the inclusion of external content within a web page such that standard browsers render both the page content and the external content together) is less clearly allowed, with one court finding that framing was a copyright infringement because the process resulted in an unauthorized modification of the linked site. (Futuredontics Inc. v. Applied Anagramic Inc., 45 U.S.P.Q. 2d 2005 (C.D. Cal. 1998). Inlining (i.e.—direct inclusion of external content in another web page mixed in with a given page) is usually considered more likely to be infringing than framing as the context has been even more clearly modified from its use on its site of origin. So, inclusion of external, rights-protected content in a web survey either via framing or inlining is likely to raise objections from the rights holders. As such, web-based survey administration tools which use web page UI elements (buttons, fields, etc) to collect responses are likely to raise objection when the survey items include trademarked or copyrighted images or phrases included either via framing or inlining. However, providing a survey—whether printed or in web form—that has links to external sites, where the rights-protected content can be viewed in its original form, should not require any prior permission and is unlikely to raise objections. While unlikely to be infringing, this makes taking the survey much more cumbersome, requiring the respondent to enter URLs or click back and forth between the external content and the page where their response is collected.

Taken together, the preceding limitations make constructing printed or web-based surveys collecting responses on icons, web sites or slogans from competing brands likely to be either potentially objectionable or unduly cumbersome.

Current survey administration systems do not use social networking and media tools as well as they could. Most current approaches do not use these tools at all. In addition to simplifying and automating the collection and or confirmation of demographic information, social graph data (personal and business connections) could be gathered as well as additional psychographic data (likes, dislikes, shared links). This additional information could be used to target potential respondents much more accurately, to identify tastemakers who are more likely to convince others to take surveys if they are so convinced, and to incentivize those more likely to be influential in recruitment more strongly. Current approaches do none of these things.

Current survey administration systems are not optimized for participation via mobile devices. While there have been methods described involving combinations of broadcast media (radio, TV) to send the questions out with mobile phones and or text messaging devices used by respondents to send their responses back, these require all respondents to be watching or listening to the questions at the same time—a requirement that limits the potential respondent pool dramatically.

Other described methods of mobile survey administration rely entirely on text messages, both to send out the questions and for respondents to return their responses. However, confining surveys to questions that can be delivered as text messages is substantially limiting, preventing questions involving images, for example.

While some web-based self-administered surveys can be taken via web-enabled mobile devices, the small form factor and limited user input methods common to these devices make taking these surveys substantially more cumbersome, driving response rates on these surveys for mobile users much lower.

While many mobile devices are capable of receiving "push notifications" (e.g.—email, text messages, alerts), these are not being used by current survey administration systems to make targeted users aware of newly available surveys they are likely to be interested in taking.

Collaborative filtering (CF) is the process of filtering for information or patterns using techniques involving collaboration among multiple agents, viewpoints, data sources, etc. Applications of collaborative filtering typically involve very large data sets. Collaborative filtering methods have been applied to many different kinds of data including sensing and monitoring data—such as in mineral exploration, environmental sensing over large areas or multiple sensors; financial data—such as financial service institutions that integrate many financial sources; or in electronic commerce and web 2.0 applications where the focus is on user data, etc.

Collaborative filtering is a method of making automatic predictions (filtering) about the interests of a user by collecting taste information from many users (collaborating). The underlying assumption of the CF approach is that those who agreed in the past tend to agree again in the future. For example, a collaborative filtering or recommendation system for television tastes could make predictions about which television show a user should like given a partial list of that user's tastes (likes or dislikes). Note that these predictions are specific to the user, but use information gleaned from many users. This differs from the simpler approach of giving an average (non-specific) score for each item of interest, for example based on its number of votes.

Factor Analysis (FA) is an approach for building a preference model that requires far fewer calculations to make a suggestion as compared to competing approaches. Factor analysis is a statistical method used to describe variability among observed variables in terms of a potentially lower number of unobserved variables called factors. In other words, it is possible, for example, that variations in three or four observed variables mainly reflect the variations in a single unobserved variable, or in a reduced number of unobserved variables. Factor analysis searches for such joint variations in response to unobserved latent variables. The observed variables are modeled as linear combinations of the potential factors, plus "error" terms. The information gained about the interdependencies between observed variables can be used later to reduce the set of variables in a dataset. Factor analysis originated in psychometrics, and is used in behavioral sciences, social sciences, marketing, product management, operations research, and other applied sciences that deal with large quantities of data.

Factor Analysis has been used with Collaborative Filtering to generate user preference models and vectors (See Collaborative Filtering with Privacy via Factor Analysis by John Canny. url: www.cs.berkeley.edu/~jfc/'mender/sigir.pdf).

SUMMARY OF THE INVENTION

The present invention relates to online surveying to determine user preferences.

It is an object of this invention to provide an online system for determining contextually specific preferences.

It is an object of this invention to provide a method for automatically creating a chimeric preference vector.

Yet another object of this invention is to provide a method for identifying new market position content.

Accordingly, a broad embodiment of this invention is directed to a system for determining preference, the system including a client, server addressable URIs and a ratings database, the ratings database including at least one record having a rated item, a rater, at least one rating value and at least one metadatum.

Another broad embodiment of this invention is directed to a method for creating a chimeric preference vector, the method steps including providing a system for determining preference, identifying a multiplicity of datasets of rated items to be used; automatically combining the datasets to form a combined dataset; automatically identifying rating collisions—cases where particular items are rated in more than one of the combined datasets; automatically resolving rating collisions to generate a treated data subset of the combined dataset; and generating a chimeric preference vector based on the treated data subset.

These and other aspects of the present invention will become apparent to those skilled in the art after a reading of the following description of the preferred embodiment when considered with the drawings, as they support the claimed invention.

DETAILED DESCRIPTION

Figure 1:
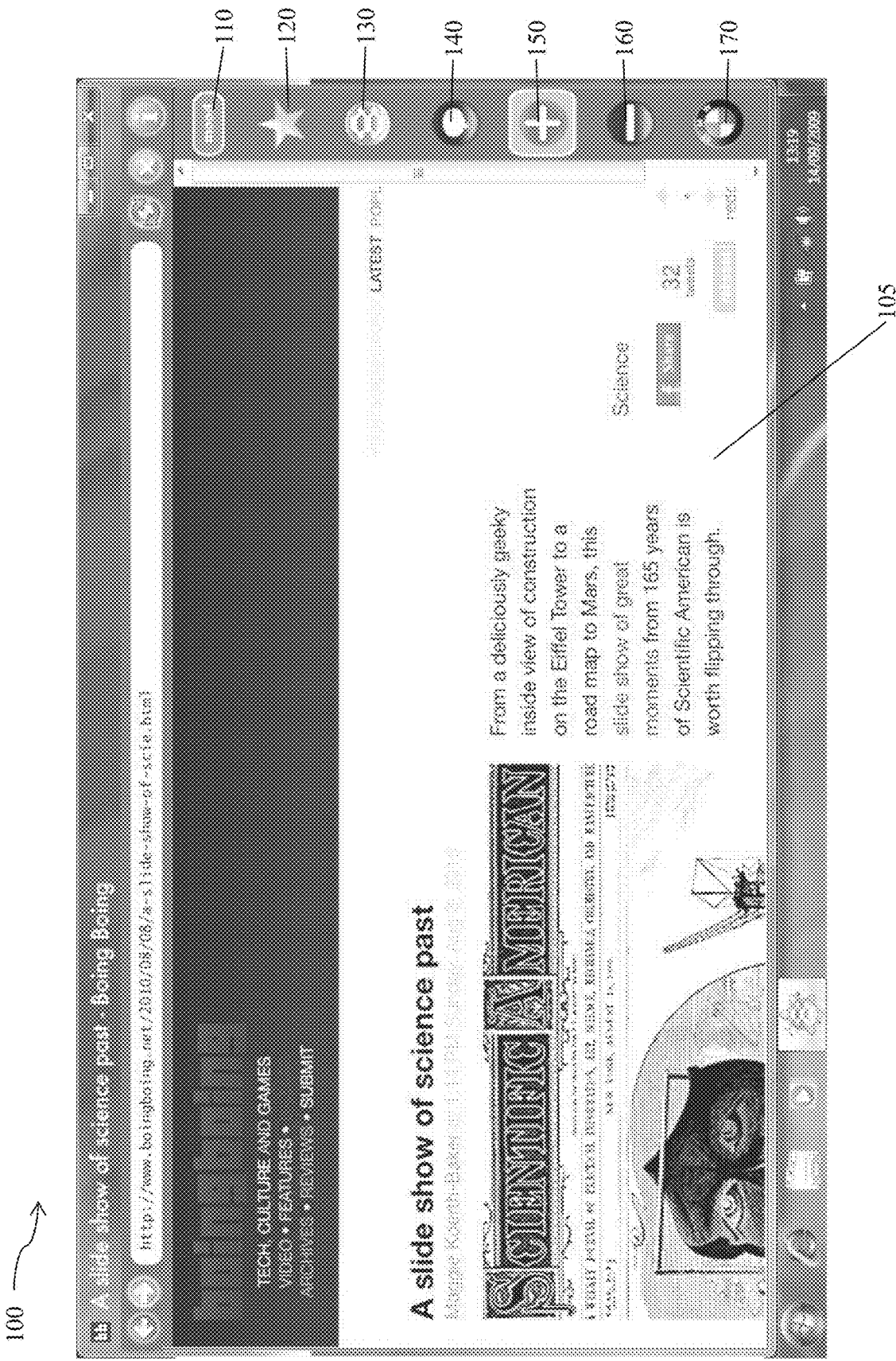
FIG. 1 is an example graphical user interface for a content browsing interface according to the invention.

Referring now to the drawings in general, the illustrations are for the purpose of describing a preferred embodiment of the invention and are not intended to limit the invention thereto.

The present invention provides systems and methods for determining user preferences, identifying users based on psychographic preferences and suggesting items to users based on those preferences.

In the present description, entities that can be rated are termed items, whereas entities that apply ratings to items are termed raters. Collaborative Filtering (CF) systems employed in the present invention use some form of preference model as a way of making suggestions to users based on their predicted preferences. The present invention uses Factor Analysis to create this preference model. Factor Analysis (FA) is an approach for building a preference model that requires far fewer calculations to make a suggestion as compared to competing Collaborative Filtering approaches. The preference model uses observed data (content ratings) to predict the likelihood of a rater preferring one unrated item over another.

An n-dimensional FA-based preference model measures preferences in terms of n separate dimensions. The number of dimensions in a given model (n) holds for the whole model. So if n is 10, the model will characterize each rater and each item in terms of 10 dimensional values. A factor is a dimension in an n-dimensional FA model.

Item factors are dimensional measurements characterizing items in an n-dimensional FA model. Rater factors are dimensional measurements characterizing raters in an n-dimensional FA model.

A preference vector is a set of n dimensional value measurements, derived from a set of ratings, characterizing preferences for items in an n-dimensional FA-based preference model. A preference vector can be calculated for any non-empty set of ratings that does not contain more than one rating for the same item.

A whole-rater preference vector is calculated using all of the ratings in the model applied by that rater.

A mood preference vector is calculated using a subset of ratings applied by a rater and marked as associated with a distinct rater state (location, time of day, day of week, a user-specified "mood" etc). Having subsets of ratings allow for a rater to have conflicting ratings for an item, dictating different preferences in different contexts.

A brand preference vector is a preference vector where the rater, such as a brand manager, product manager or advertising firm for the brand, rates content on behalf of the brand's preferences. Brands can have moods, just as any other rater.

A user preference vector is a preference vector where the rater is a specific user of a content suggestion system. Users can have moods, just like any other raters.

An adopted preference vector is a preference vector used by an entity that is not based on that entity's ratings.

A chimeric preference vector is a preference vector calculated from a combination of ratings associated with different raters and/or moods.

A popular preference vector is a preference vector that is frequently adopted.

A "highly-adoptive" user is a user that frequently uses an adopted preference vector.

The present invention uses factor analysis to build a preference model for users. The model can be used in a variety of manners, including for making suggestion to user(s) based on their predicted preferences. Users rate content to create a dataset of rated content, which the system uses to create a preference model, which is then used to generate preference vectors for each user. The present invention differs from prior art methods in that it provides for creating moods and chimeric vectors. A chimeric vector is created by first identifying a multiplicity of user datasets of rated items to be used to create the chimeric vector. Once identified, the datasets are automatically combined to form a combined dataset; items with ratings collisions are automatically identified and treated to generate a treated data subset of the combined dataset. A chimeric vector is then generated based on the treated data subset.

The method step of treating the items with ratings collisions includes such treatments as: using one rating while ignoring other colliding ratings, ignoring all colliding ratings, averaging colliding ratings, converting differently-rated items to a strong dislike (to avoid content that is likely to highlight differences in preference), and so on.

Any set of ratings can be used to predict preferences for items by raters. A set of ratings associated with a particular context predicts preferences for items in that context. A ratings context could include all the ratings applied by a rater (generating a whole-rater preference vector), or it might include only the ratings applied by that rater while in a specific mood (generating a mood preference vector). The rater can be a person or a brand. In the case of brands, the moods can be created and the actual ratings applied by someone responsible for the brand, such as a product or brand manager or advertising manager. A set of ratings associated with an item creates an item context, which can be used to predict which raters or rater moods will like or dislike that item. Also, two sets of ratings can be taken to see how well they match—which is to say how well the predictions made with vectors from each will match.

In the method described, at least one of the datasets may be a subset of rated items. Also, at least one dataset may be by a rater and at least one dataset a dataset of ratings for a rated item. The rated item may furthermore be a corporate commercial entity or brand. Thus, the present invention can be used to create chimeric vectors for a variety of uses. For example, chimeric vectors can be created for brands, market positions, characters, products, actors, celebrities, personalities, politicians, leaders, and the like.

As a specific example, the present invention can be used to create a vector for a new, aspirational market position for a business or business product or service. The method steps include: indicating a dataset of rated items for a current market position; indicating a dataset of rated items for a target market position; automatically combining the datasets; identifying the rating collisions; treating the collisions and automatically generating a treated data subset of the combined dataset; automatically creating a new market position vector from the treated data set; and automatically identifying content items to suggest to users and those users who are most likely to adopt the new market position to receive the suggested content items during the transition from the existing market position to the new market position.

The combined datasets can be treated in a variety of ways to create the treated data subset. For example, ratings collisions where most or all ratings were positive can retain the positive rating. Collisions where most or all ratings were negative can retain a negative rating. Collisions where ratings strongly disagree can be weighted with a negative rating, such that the rated item and similar content is not offered as preferred content.

The present invention includes a system for surveying preferences, generating a preference model, and determining preferred offerings. The system includes a client device for receiving preference ratings from the user and forwarding them to the server, a server for hosting the preference modeling software and ratings database, and addressable URIs. The client device and server are in communication over a network and the URIs' content is retrievable over the network.

The client UI has selectable feedback controls for providing feedback from the user; the server automatically receives and stores ratings from the clients, tracks URIs, uses preference ratings to create a preference model for URIs, and uses the preference model to suggest URIs to users. All the ratings generated by the client are available to the preference model.

Figure 2:
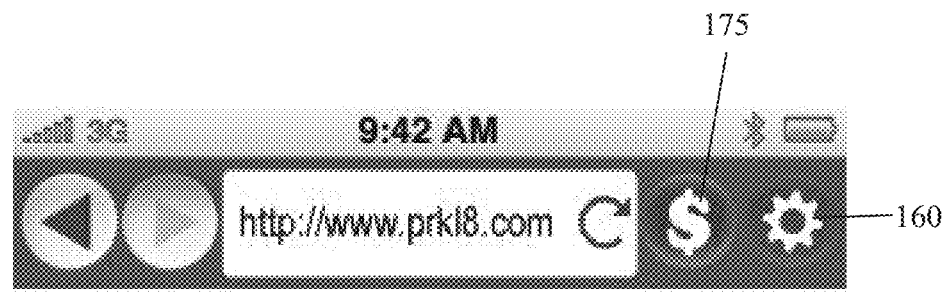
FIG. 2 is another example graphical user interface for a content browsing interface according to the invention.
Figure 2:
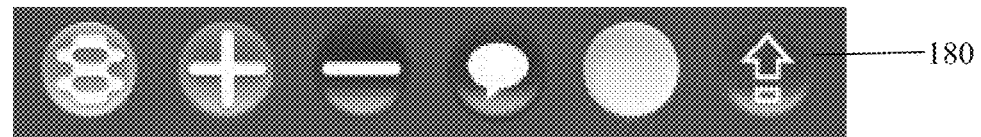

An example client UI is shown in FIG. 1. The client UI, generally shown as 100, is shown in the example as a sidebar, separate from the survey content 105; however, other orientations are possible, such as at the top or bottom of the content, free-floating and the like. The UI can include a mood button 110 for selecting or creating a mood; a status icon 120 (a star in the example); a "suggest content" button 130; a share/comment button 140, a "like" button 150, and a "dislike" button 160. An optional channel selection control 170 can be included. The channel selection control allows user to indicate that suggestions should be limited to a specific area of interest (a channel). Preferably, controls can be used in multiple ways (e.g., be clicked, pressed and held, right-clicked, or pressed in combination with another press on a multi-touch capable device) to provide other related options to the user. Another example UI is shown in FIG. 2. In this embodiment, the "$" button 175 navigates the UI to coupon mode. The "gear" button 160 navigates to mood selection or a general settings page that includes mood selection. The "up arrow" button 180 is a toggle for showing the top bar in browsing mode.

A record in the ratings database includes a rated item URI and or ratings for a set of related item URIs, a rater having a unique identifier, at least one rating value provided by the rater for the rated item, and at least one metadatum for creating subsets of ratings. For example, restricting ratings to those with values in a specific range for at least one metadatum would define a mood subset that could then be used to create a mood preference vector. Examples of mood preference vectors include those based on ratings subsets defined by automatically applied rating metadata (client device type, location, time of day, day of week, month, season, and so on) and or user-specified metadata such as a chosen "mood."

Preferably, the feedback controls are independent of displayed content identified by the URIs and are dynamically assignable by the server. In the case of displaying survey content, for instance, the survey creator will be able to choose which feedback controls are displayed with each item in the survey. Thus, the client includes feedback controls which are independent of the content, and which are dynamically alterable to be best suited to collecting opinion on the content in question.

The present invention further includes a survey administration system. The survey administration system described herein uses these and further described systems and methods to create a complete, incentivized, targeted content delivery and opinion gathering system, especially optimized for maximizing response rates of mobile device users.

The system according the present invention works with existing, widely-deployed hardware, operating systems, software distribution systems and data networks. The system applications are preferably accessible through the Internet or similar network.

The per-potential-respondent-contacted costs should be similar to those for web-based, self-administered surveys. However, substantially improved targeting based on respondent location, demographic, psychographic and social graph criteria should be able to improve response rates as well. This combination should reduce costs and reduce the time required to gather sufficient results for analysis.

Figure 3:
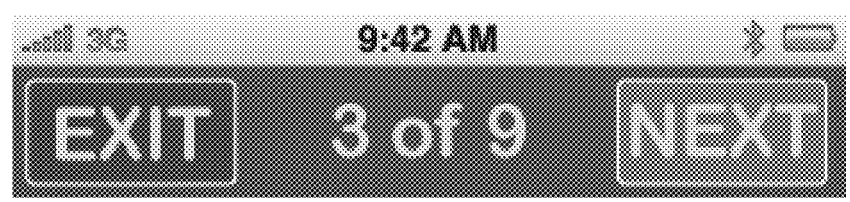
FIG. 3 is an example survey feedback control set according to the invention.
Figure 3:
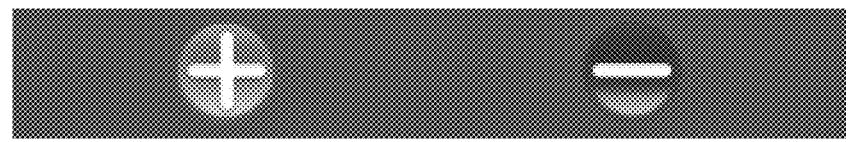
Figure 4:
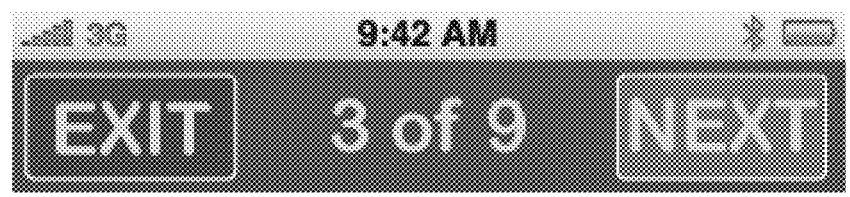
FIG. 4 is another example survey feedback control set according to the invention.
Figure 4:
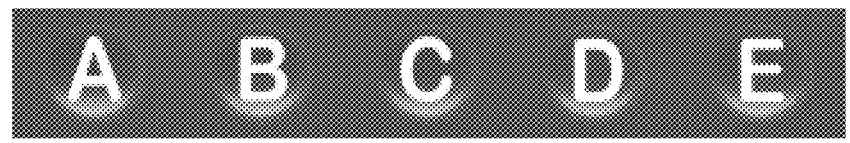
Figure 5:
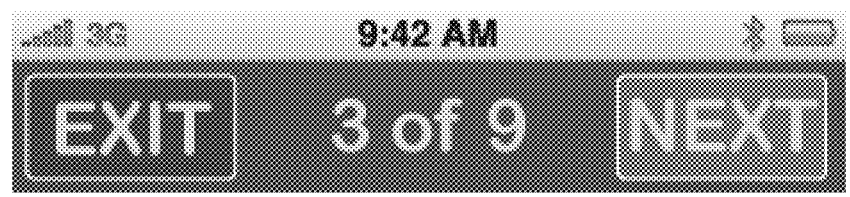
FIG. 5 is another example survey feedback control set according to the invention.
Figure 5:
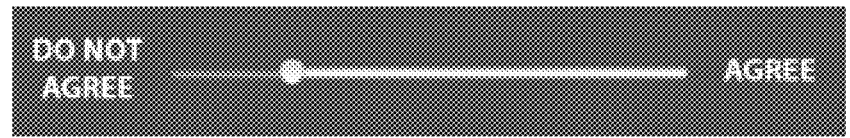
Figure 6:
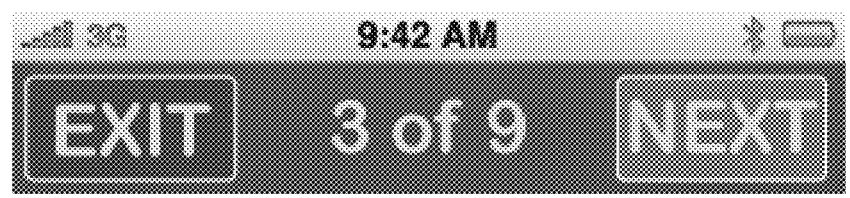
FIG. 6 is another example survey feedback control set according to the invention.
Figure 6:
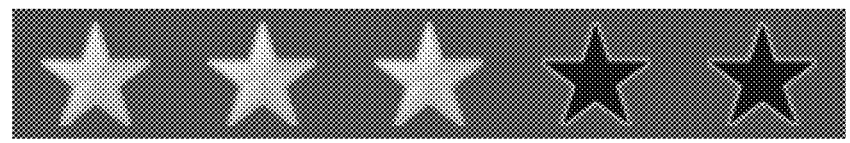

The system simplifies the creation of surveys by providing templates and using URLs to provide survey content. Templates are provided for different kinds of surveys based on the order the survey items are to be displayed to respondents, including for sequential and decision tree/adaptive survey types. Survey designers fill in the templates, entering text or URLs to define survey items and selecting from several available feedback control sets, e.g., buttons or sliders: [true, false]; [like, no opinion, dislike]; [−2, −1, 0, +1, +2]; [A, B, C, D, E]; etc). Examples of control sets are shown in FIGS. 3, 4, 5, and 6. FIG. 3 is an example of survery mode where the survey designer wants a simple "like" or "dislike" response. The "EXIT" button exits the survey. The "NEXT" button stores the current response and moves on to the next survey item. FIG. 4 is an example of survey mode for an item where the survey designer wants the respondent to choose one of multiple offered choices, in this case labeled "A", "B", "C", "D", and "E". FIG. 5 is an example of survey mode for an item where the survey designer wants the respondent to gauge their reaction between two extremes using a slider UI control. In this case the extremes are "DO NOT AGREE" and "AGREE", but these can also be set by the survey designer. FIG. 6 is an example of survey mode for an item where the survey designer wants the respondent to rate the content using a 0 to 5 star rating.

URLs identifying content containing trademarked or copyrighted material may be used with substantially reduced risk of raising objections from rights-holders as the content will be shown completely and without modification.

The system simplifies the administration of surveys, providing extremely simple, self-service, automated tools for: selecting the number of respondents required with particular characteristics (based on demographic, psychographic, location and or social graph data); selecting the analyses to run once sufficient responses are collected; displaying the estimated survey administration costs and/or the expected survey time and updating them as options are changed; paying for and initiating administration of an entered and targeted survey; monitoring the progress of surveys as they are being administered, including number of respondents collected, both overall and by targeted group. The system takes care of the remaining tasks, eliminating the need for a great deal of technical or domain-specific expertise normally required to administer the survey.

The present invention works on full-sized desktop and laptop computers, but is preferably optimized for use on mobile devices, e.g. smart phones, netbooks, and tablets. Current device and network limitations are taken into account when suggestions are made. When available, current location is taken into account when suggestions are made. The UI is designed and configured to minimize the user input required to access functionality.

By using the system to receive suggestions and rate content, the user is voluntarily submitting data that builds and improves the system's psychographic profile of them—that is what they like and dislike. The system maintains longitudinal data, thus improving the psychographic profile. The same system can be used to target surveys and promotions based on what users like. The psychographic model that helps predict which content the user is more likely to enjoy can also be used to help target a survey; for example, suggesting a survey about boats to users who are interested in boating.

The system further provides enticements to add demographic, psychographic, location and social graph data as well as to take surveys in the form of a points-based rewards program. Points are given for doing anything that builds or extends the user profile with useful data, for example, adding demographic details (age, sex, zip code, etc.); connecting to social networks or social media services; viewing suggested content; rating content; sharing content; taking surveys and the like.

Points determine visible status indications (e.g.—"level" icons associated with the user). Gaining more points leads to having a higher "level" and or more impressive "level" icons associated with the user. This encourages the user to consider participation in the system in the context of a game and rewards them for taking desired actions. In the example shown in FIG. 1, the status icon (120) is a star. As the user rates more items the star gets bigger and/or changes color, progressing through silver, gold, platinum, etc.

Points are also offered as a generic enticement for taking surveys. While generic as an enticement, points are easily adjusted dynamically. Fewer points can be offered as an incentive to potential respondents in well-represented target groups. More points can be offered to potential respondents in poorly represented target groups.

The system provides a way to convert accumulated points into real world benefits through the use of coupons. Some "standard" coupons are available to all users for a fixed number of points. Other "bonus" coupons can be more dynamic. For example, coupons or extra points may be made available only to users who meet specific criteria (users with demographic, psychographic or social graph characteristics or who have completed particular surveys); coupons or other rewards or motivational devices may be made available for differing quantities of points depending on specific criteria (as above); and/or coupons or other rewards or motivational devices may be offered pro-actively for few or no points ("pushed") to targeted users as part of a brand promotion effort. These can be issued based on a variety of factors, for example, coupons can be issued based on the psychographic or demographics of a user, their social graph characteristics, which survey has been taken, and/or what the survey results were.

Thus, a method for providing targeted motivational devices to a rater includes the steps of: providing a system for providing preference-driven offerings, the system comprising a client device, a server and addressable URIs; the client device, server and URIs in communication over an electronic network and the URIs retrievable over the network; the server automatically receiving and storing ratings, tracking URIs, using ratings to create a preference model for URIs, and using the preference model to suggest URIs; wherein the stored ratings include at least one record having a rated item URI, a rater having a unique identification, at least one rating value provided by the rater, and at least one metadatum for creating subsets of ratings; and wherein all ratings are available to the preference model; identifying a first rater with a preference vector; comparing the preference vector of the rater with the preference vectors of at least one item with a motivation device; identifying candidate items most likely to be preferred by the rater; pushing at least one of the motivational devices for the candidate items to the rater; thereby providing a method for pushing motivational devices to raters.

Users can also be alerted to surveys and/or surveys with rewards that may be of interest to them.

As an example of push surveying according to the present invention, a brand manager wishing to determine the acceptability of a new product first determines the psychographic profile of a user who likes the brand. The brand manager then determines a motivational device that will motivate users and or users in particular moods matching such a profile and creates a survey designed to determine the user preference for the new product. The survey administrator then pushes the survey and motivational device information to users who prefer the brand.

Coupons, rewards and motivational devices can be redeemed in a variety of manners. For example, coupons may be printed out and taken to a point of sale; delivered directly to a mobile device and stored on that device such that they may be scanned at a point of sale directly from the display of the mobile device or forwarded as an email or to a fax.

Figure 7:
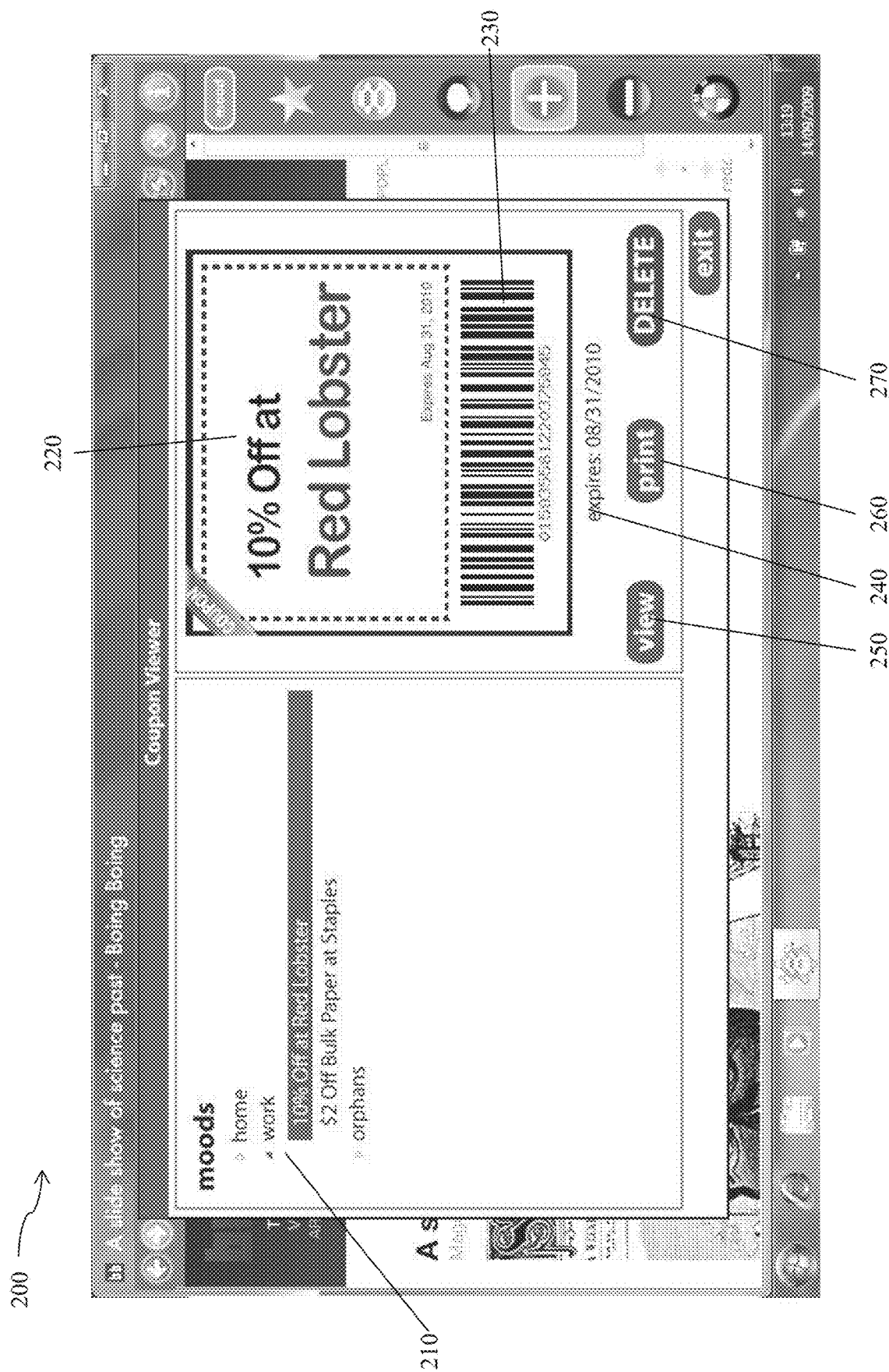
FIG. 7 is an example graphical user interface for a coupon administration interface according to the invention.

Coupons are uniquely identified, and the system according to the present invention provides a tool for merchants to check whether a coupon is legitimately issued and has not been previously used. The system can also integrate with existing customer rewards programs by associating merchant-issued user IDs with the coupon. These IDs can be added to the coupon as scannable codes or can be returned automatically by the coupon validation tool. FIG. 7 shows an example coupon user interface, generally described as 200, according to the present invention. Coupons can be stored on the local device in a manner that does not require network access to display them and thus can be displayed directly on the device at a point of sale even if the network coverage is not available there. Coupons may be stored for future retrieval according to moods, as shown in the mood tree 210. A coupon 220 includes a unique identifier 230 and preferably an expiration date 240. The interface also includes buttons to view the coupon 250, print the coupon 260 and delete the coupon 270, and the like.

Figure 8:
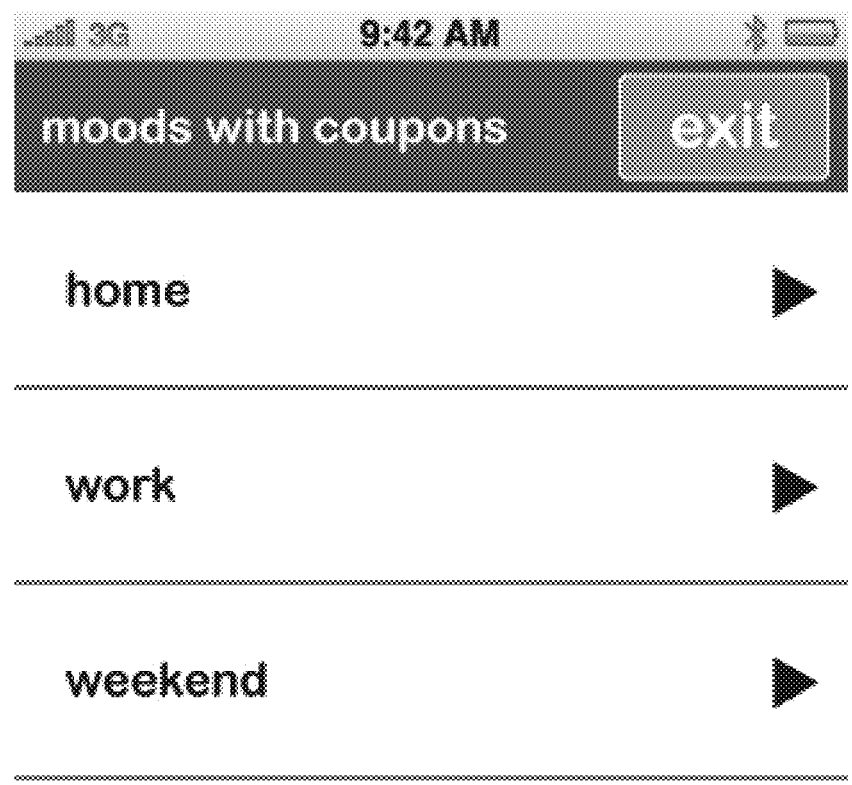
FIG. 8 is another example graphical user interface for a coupon administration interface according to the invention.

Another example coupon interface is shown in FIG. 8, showing the list of moods that have valid coupons associated with them. The "exit" button navigates back to the browsing mode. Selecting a mood in the list shows the coupons associated with that mood, as shown in FIG. 9.

Figure 9:
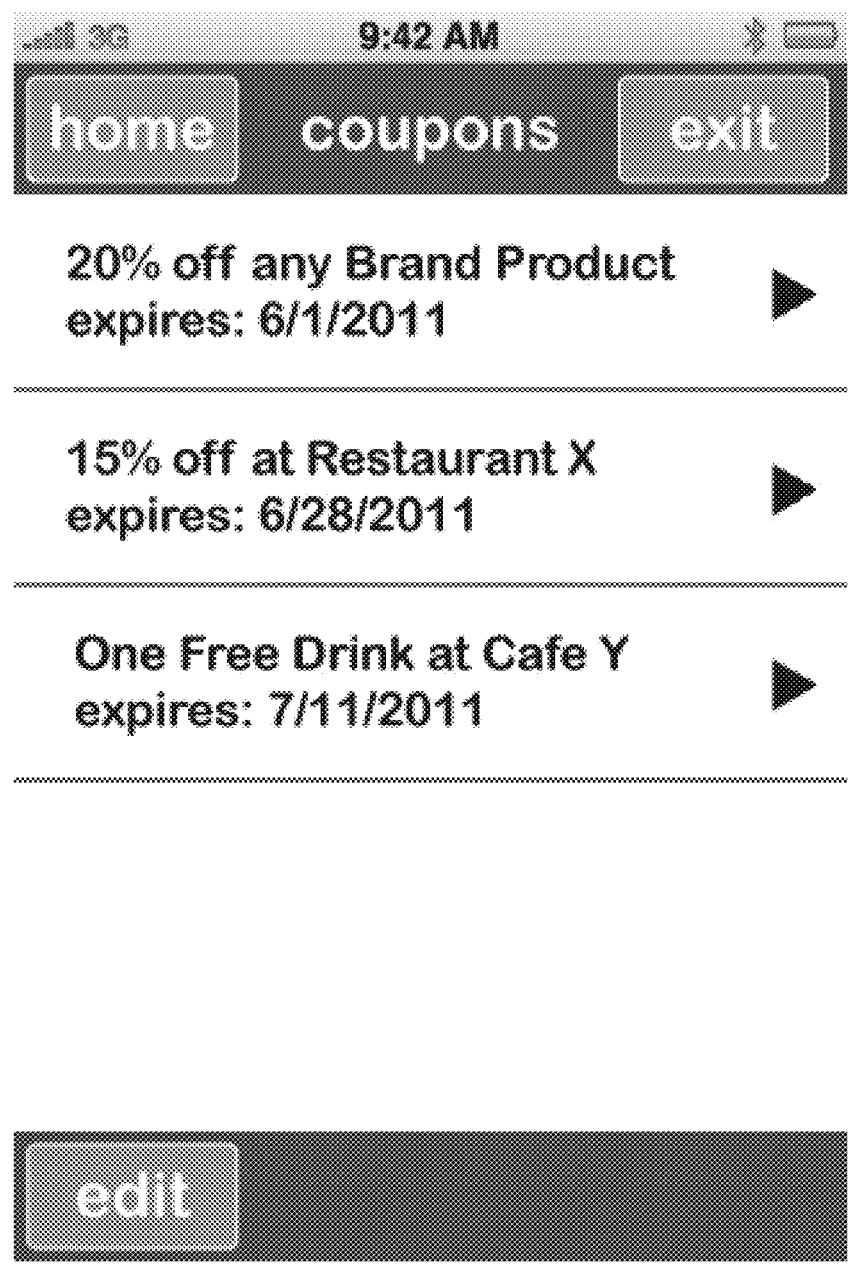
FIG. 9 is an example graphical user interface for a coupon administration interface according to the invention.

FIG. 9 shows a list of 3 coupons associated with the user's "home" mood. The "home" button navigates back to the list of mood with coupons (as shown in FIG. 8). The exit button exits coupon mode, navigating back to browsing mode. The "edit" button allows the user to change the order of the coupons and/or delete them from this list. Clicking on a coupon list entry shows the coupon itself, as shown in FIG. 10.

Figure 10:
FIG. 10 is an example coupon interface according to the invention.

FIG. 10 shows an actual coupon. The "coupons" button navigates back to the previous screen (the coupon list). The "exit" button navigates back to browsing mode. The "mark as used" button is used when the coupon is used at a point of sale. Clicking anywhere on the coupon toggles whether the control bars and buttons are shown in this view.

The present invention preferably is integrated with social networking systems. This integration provides a benefit to the users in that it enables the sharing of content with friends and followers on any or all connected social networking systems or other communication systems such as email with a minimum of UI interaction. For instance, the preferred embodiment enables the user to press one button ("share"), then enter a comment, then press one more button ("OK") to have a link to the content along with their entered comment instantly posted to both their Facebook wall and their Twitter account.

The preferred embodiment would also use information about what content a user has shared with their friends and what their friends have shared with the user as a source of potential content to suggest, as data used to adjust the choice of which items users are more likely to prefer, and as a filter to avoid suggesting content that a user has already seen. For example, if a user had shared an item on Facebook independently of the present system, they have probably already seen it, and suggesting it would be redundant. Another example would be if three friends had all suggested an item that the system expects the user would like but has not yet seen, then the system might be more or less inclined to suggest that item over another that none of the user's friends had suggested.

The preferred embodiment would also use "social graph" data, both to enable access to particular content and to add to the user's profile for purposes of targeting both content suggestions and surveys. In terms of enabling access, one example would be making an exclusive content "channel" available only to users who had connected a Facebook account to the system and who were "fans" of a specific Facebook page. In terms of targeting based on social graph metrics, a survey could be made available only to users with a Twitter account connected that currently has more than 1000 followers.

The present invention provides a content discovery, rating and sharing service. It suggests content to users based on user interests and past content ratings (likes and dislikes). Rating content (suggested or otherwise found) improves the quality and personalization of the content suggestions while building and improving the system's psychographic profile for the user. Sharing content via multiple connected social networks is enabled with minimal UI interactions, making sharing discovered content easier for users while building and improving demographic and social graph data for the user in the system. Surveys are one of the kinds of content that the system can suggest, and surveys available to a particular user are accessible through the always available survey channel.

The present invention provides for subsets of content organized into content channels. These content channel subsets can be added to and dynamically assigned by the system or added to and assigned by an administrator of the system. These content channels can be represented by a control button on the main level or on a sub-level and selected by the user through the main control button or a sub-level control button. Content channels can include any URI content including web content, images, video, and motivational devices including brand content, promotional materials, incentives, and the like.

Figure 11:
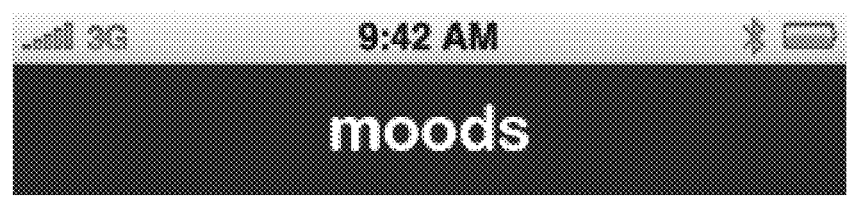
FIG. 11 is an example interface for mood administration according to the invention.
Figure 11:
Figure 11:
Figure 11:
Figure 11:
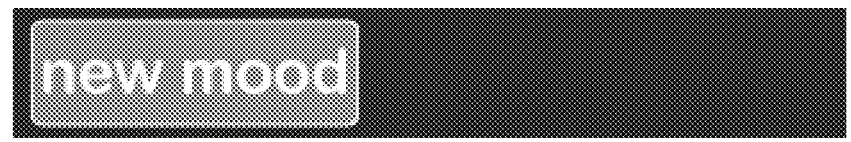

The present invention allows users to have different "moods" in which they indicate that they are likely to prefer different sorts of content (e.g.—a user might have a "home" and a "work" mood). FIG. 11 shows an example list of available moods for the user. Clicking on one of the moods in the list selects that mood and returns to browsing mode with the selected mood now in use. The "new mood" button can add a new mood to the list.

These moods are taken into consideration when suggesting content, and allow a user to denote context-specific differences in their preference for certain content. These moods prevent what would otherwise be ratings collisions due to different preferences in different conditions.

Suggestions are made taking user device and network limitations into account (e.g. Flash videos are not suggested to iOS devices or any video content to devices without at least a 3G network connection) in addition to mood and past ratings.

Suggestions can be selectively narrowed by users to content associated with a chosen channel—that is a subset of content that might be from a common source (a brand channel), is functionally related (a "coupons" channel), or is topically related (a "sports" channel). Some channels are always available, others can be made available when certain conditions are met; having a specific demographic profile, having finished a particular survey, and being a fan of a particular organization on Facebook are all examples of likely conditions. Content creators, libraries and distributors can sponsor channels, which contain content from a subset of items selected by the sponsor. Channels can be transitory, linked to limited-time surveying or promotional efforts. Channels can be dynamically targeted, with a given channel containing different subsets of content for users with differing demographics or psychographics, for instance. Viewing behavior of channels and ratings applied to channel content can help identify interest-based groups—"superfans" of a brand, for instance.

The present invention has a special survey mode that optimizes the UI for administering a survey, especially on a mobile device where space tends to be more limited and UI interactions tend to be more cumbersome. UI elements that let the user load new content or otherwise navigate may be hidden or disabled while in survey mode. This includes the elements to suggest new content, suggest content from a channel, return to the previous page, and to specify a URL to load. These would lead to a less controlled, potentially out-of-order exposure to the survey items. In the place of the disabled or hidden UI elements are two buttons: next and exit. This ensures the respondent will traverse the survey in the expected order to whatever extent they complete it. UI elements allowing a wider range of responses than the basic like and dislike buttons may also be added. These can be dynamically adjusted amongst available survey response types, including: just the like and dislike buttons (which may also be used for "true" and "false" responses); a multiple position slider with the like and dislike buttons moving the slider up and down respectively; a set of labeled buttons ("A", "B", "C", "D", "E"); the UI elements for registering responses and for survey traversal are part of the client application, not part of the web page shown in the content pane.

Figure 12:
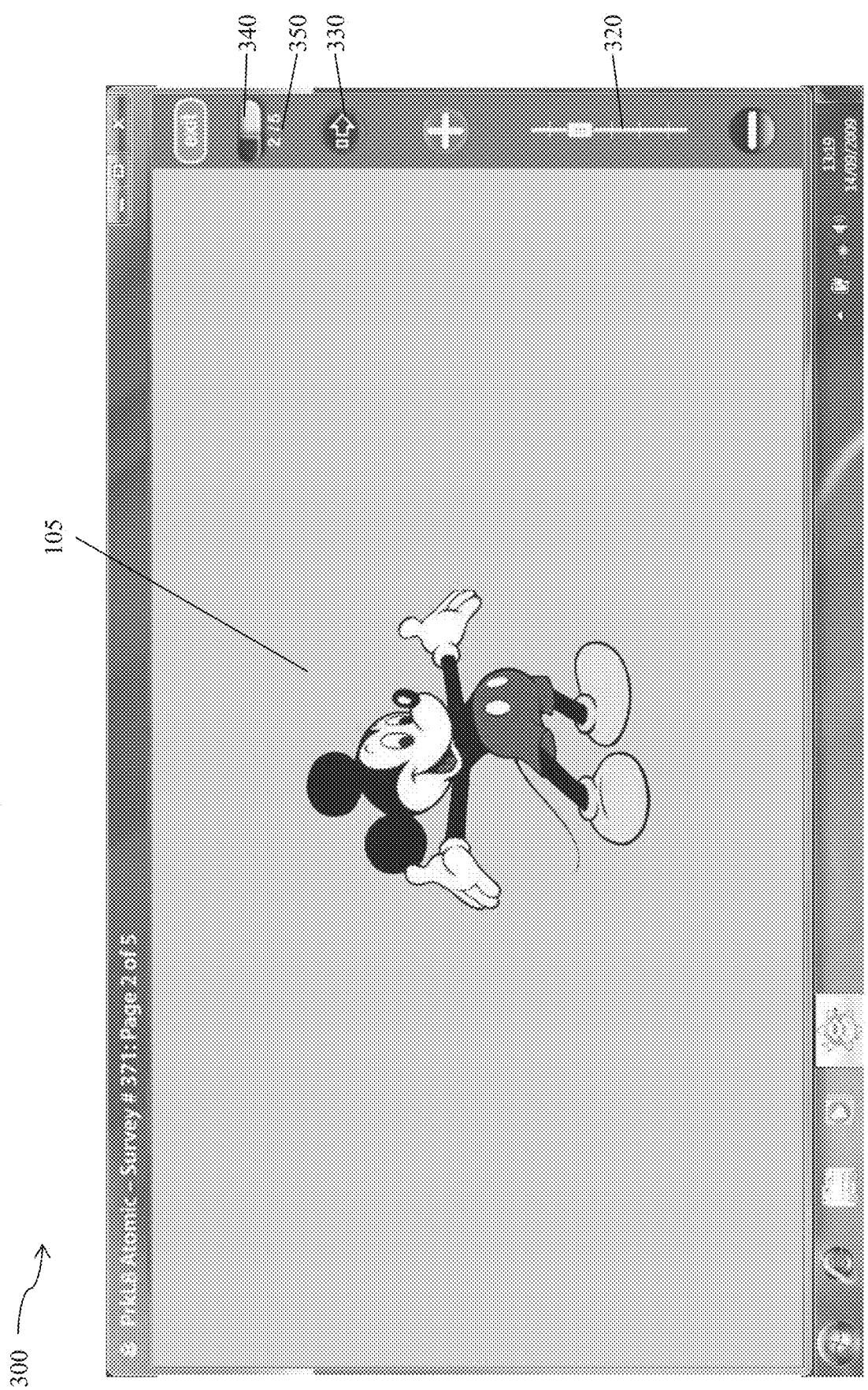
FIG. 12 is a graphical user interface for a survey interface according to the present invention.

An example survey UI is shown in FIG. 12. In this survey UI, generally described as 300, a content window 105 presents survey content. The rater then rates the content using the slider 320, sliding the slider towards the "+" for a more favorable rating and towards the "−" for a less favorable rating. Once the content has been rated, the rater selects the next content button 330. Progression through the survey is shown with a progress bar 340 and numeric index 350. Should the rater decide to terminate the survey early, he selects the "exit" button.

This separation of survey content from survey controls ensures a more consistent user experience for respondents. The separation also ensures that survey content is shown completely and without modification, rendered just as it would be in any standard web browser. This reduces the likelihood of objections being raised by rights-holders when trademarked or copyrighted content is presented to a respondent for their reaction.

The present invention provides tools for market researchers to build, target and administer surveys. Market researchers log into a survey administration application, which provides tools to: monitor the progress of surveys currently underway; adjust targeting criteria for surveys currently underway; review the results and analysis of past surveys; create, target and initiate new surveys.

Each survey monitor page preferably displays the number of respondents, both overall and broken out by targeted group, and provides a link to a retargeting page, enabling adjustments to be made to the targeting for that in-progress survey.

Completed surveys each have a review page where the final results are displayed. Links are provided to pages containing the results of requested analyses performed on the collected responses for that survey.

Creating and targeting a new survey is managed through a simple, template-based, self-service interface. Market researchers start by clicking a "new survey" button. They proceed to a targeting page where they define the respondents they are interested in by specifying required demographic, location or social graph related criteria. From this page they may also click on a link that allows them to target the survey using psychographic profiles. A target psychographic profile can be defined by selecting content (URLs) that the desired respondents would be expected to like or dislike. Any preference profile (e.g.—a user profile, a user mood profile, a brand profile, a brand mood profile, etc) can be used as an exemplar profile, meaning that the survey should target potential respondents with profiles similar to that of the exemplar (i.e.—target users who like and dislike similar content). Especially when a target psychographic profile is likely to be used for multiple surveys, the use of an exemplar user is usually faster and easier than specifying a collection of URLs.

Once targeting is complete, the market researcher proceeds to the survey creation page. Here they select a survey template, then fill in the survey items. Templates are available for sequential surveys (i.e.—all respondents get the same items in the same order) as well as for adaptive or "response tree" surveys. Items are filled in as either text, HTML fragments or provided as a URL. Text items will be shown to respondents as a minimally formatted web page containing the provided text. HTML fragments will be shown to respondents contained in a <div> element in a minimally formatted wrapper page. Content specified by URL will be shown to users complete and unmodified, exactly as if the respondent had entered the URL into a browser by hand or had clicked on a hypertext link directing their browser to load the content specified by that URL. Items can be added or removed as needed to construct a survey of the desired length.

After targeting and survey construction are completed, the market researcher has the option of specifying targeted rewards. Targeted rewards enable the survey to serve a dual purpose, both collecting information and enabling a highly targeted brand promotion effort. Targeted rewards can be specified as URLs linking to external rewards programs or mechanisms. Targeted rewards can be specified as a dollar-value equivalent of points (e.g.—$10 in points). Targeted rewards are given to respondents with specified profile criteria after having completed the survey, as a bonus, over and above the points offered prior to the survey as an enticement. Targeted rewards are targeted using the same criteria that are used to target the desired survey respondents more broadly. As such the targeted rewards page looks very similar to the basic (re)targeting page for the survey. However, the targeted rewards will usually target a subset of the respondents targeted by the survey overall.

After targeting and survey construction are completed and the optional targeted rewards are defined or bypassed, the market researcher is taken to a payment page. Here they are shown the cost for running the survey they have just created and targeted. They are given the option to pay for and initiate the survey, to edit the survey details, or to save the survey for later editing or use.

Figure 13:
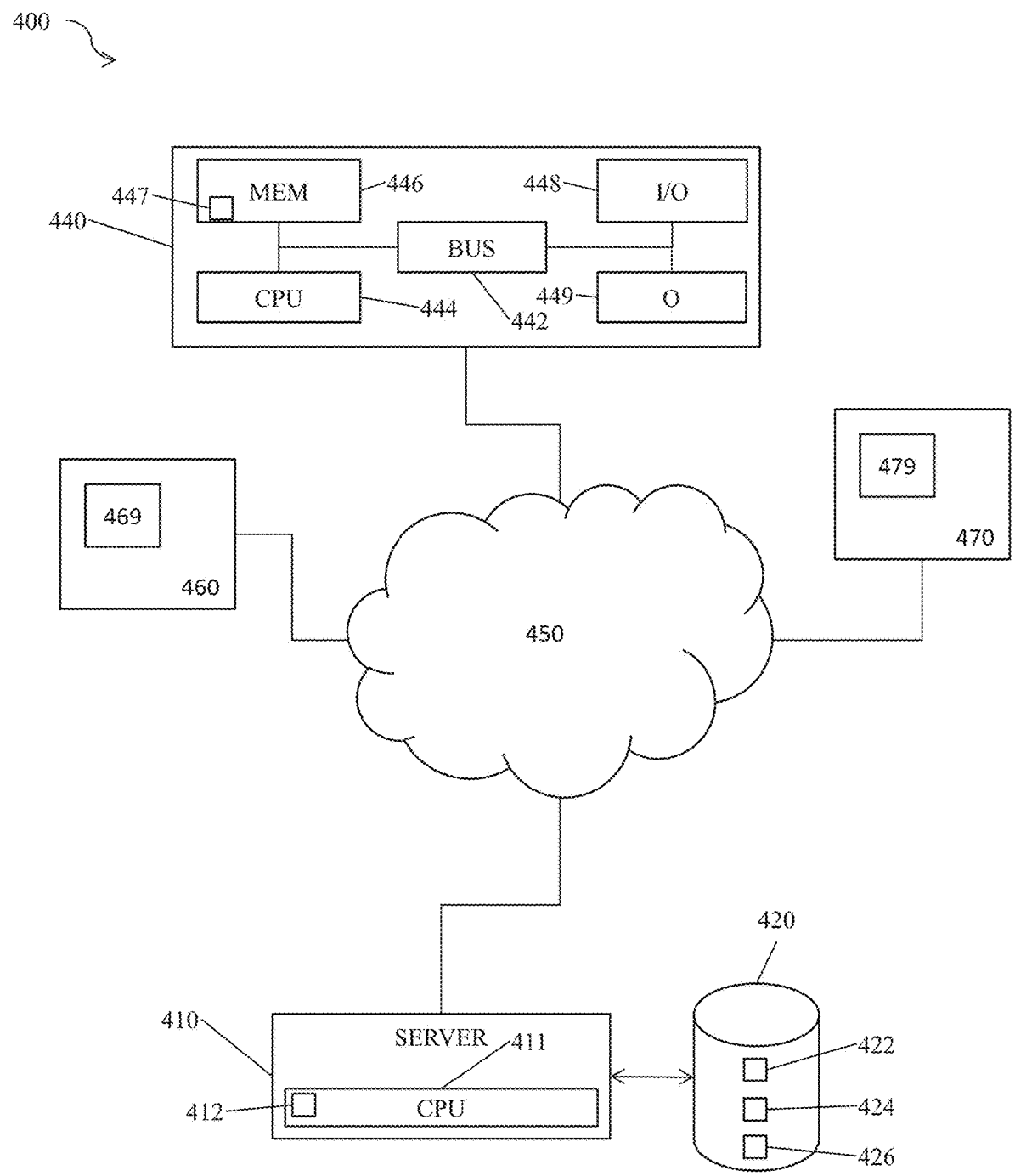
FIG. 13 is a schematic diagram of a system embodiment of the invention.

As shown in FIG. 13, the system, generally described as 400, includes a server 410 with a processing unit 411. The server 410 is constructed, configured and coupled to enable communication over a network 450. The server provides for user interconnection with the server over the network using a client computing device 440 positioned remotely from the server. Furthermore, the system is operable for a multiplicity of remote client devices 460, 470. A user may interconnect through the network 450 using a user device such as a computer, personal digital assistant (PDA), mobile communication device, such as by way of example and not limitation, a mobile phone, a cell phone, smart phone, laptop computer, netbook, a terminal, or any other client device suitable for network connection. Also, alternative architectures may be used instead of the client/server architecture. For example, the server could actually be a cluster of load-balanced servers connecting to a central data store, or the data store could be a cluster of servers or a cloud-based data storage service. Alternatively both the server and the data store could reside on a single networked PC acting as a server for an intranet. The network 450 may be the Internet, an intranet, or any other network suitable for searching, obtaining, and/or using information and/or communications.

The system of the present invention further includes an operating system 412 installed and running on the server 410, enabling server 410 to communicate through network 450 with the remote, distributed user devices. The operating system may be any operating system known in the art that is suitable for network communication.

A memory 420 is interconnected with the server 410. The memory 420 may be integral with server 410 or may be external to the server and interconnected therewith. A factor analysis software program 422, ratings database 424 and preference model 426 is stored in memory 420. Alternatively, the software handling the factor analysis modeling can be running on a server that may contain the database, but might also just connect to it. The factor analysis can also be implemented entirely within a database, using triggers and db scripts.

According to an exemplary embodiment, the factor analysis program is computer executable code for using information derived from user inputs to maintain the preference model and ratings database. Alternatively, portions of the program or the whole program may be installed on a user's computing device 440.

A user may connect to the server 410 through network 450 from a client device 440. According to an exemplary embodiment, client device 440 is a mobile client device. Client device 440 is interconnected to the network 450 such as through a modem, an Ethernet card, or the like. A processing unit 444 may be interconnected with a memory 446. The client device 440 may also include one or more input/output devices 448, such as a mouse, a keyboard, a printer, and the like interconnected to the processing unit 444. A display 449, 469, 479 may be interconnected with the respective processing units for providing a graphical user interface.

Client device 440 may have a program of instruction 447, such as a driver enabling client device 440 to interconnect with server 410 through network 450.

Regarding methods using the system, the user inputs information into the memory 420, the server 410 creates or updates the preference model and ratings database.

Figure 14:
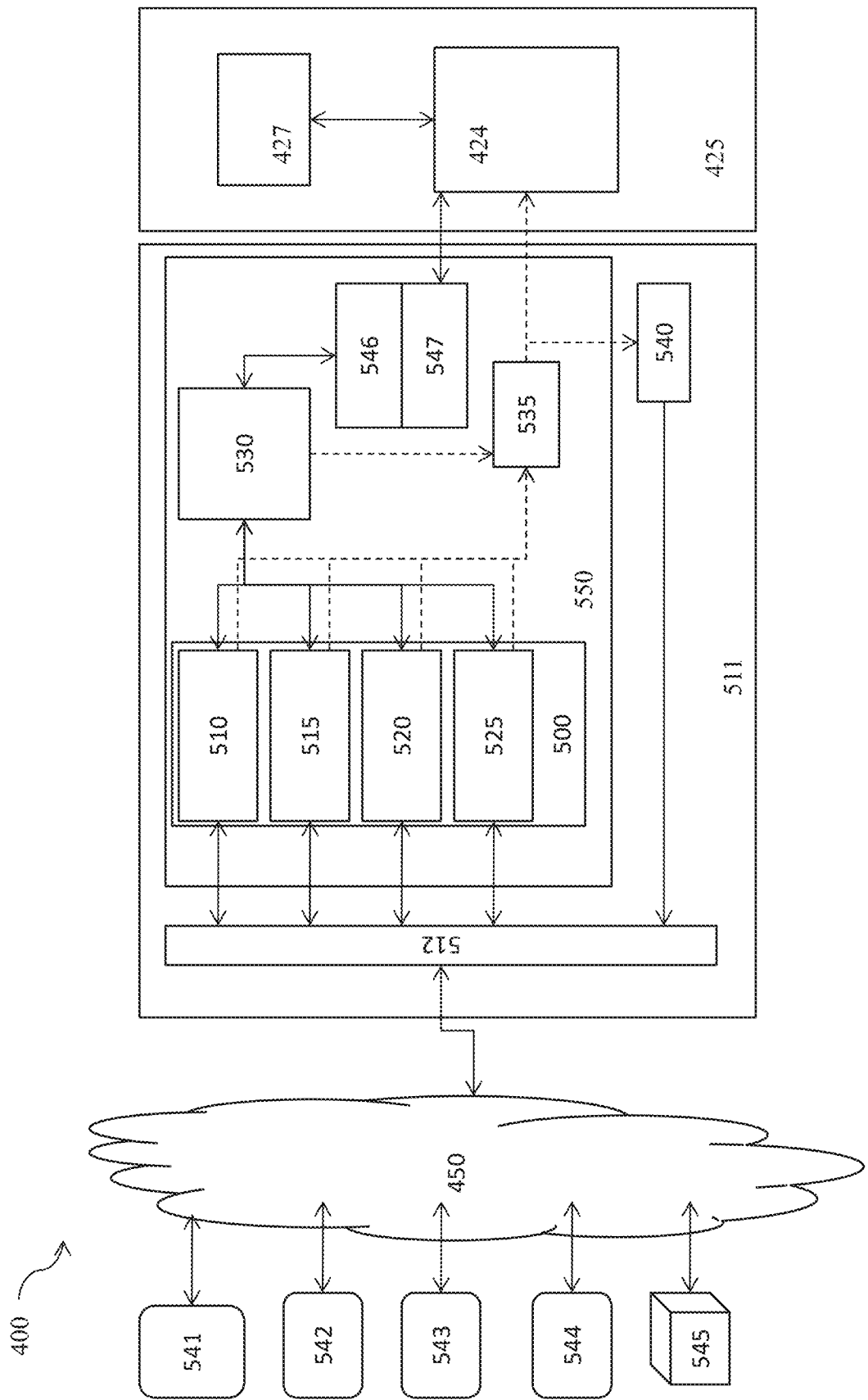
FIG. 14 is a schematic diagram of another system embodiment of the invention.

Another example system embodiment of the present invention is schematically represented in FIG. 14. As shown in this drawing, the system includes an application server 511 in communication with a database server 425 and via an Apache HTTPd service 512 over a network 450 with client devices such as mobile clients 541, desktop clients 542, advertisers/surveyors 543, analytics consumers 544, and autonomous agents 545.

The database server 425 hosts a database 424 running scripts 427.

The application server 511 includes a servlet container 500 which contains the client application 510, analytics application 515, ad/survery management application 520, agent services application 525. The server further includes a business model object application 530, a logging app 535, and a file system 540, all in communication with one another. The business model objects application is further in communication with the database via a Hibernate 546 and JDBC application 547. The servlet container apps, business model objects, logging application and Hibernate/JDBC are preferably running on a JAVA platform 550.

Certain modifications and improvements will occur to those skilled in the art upon a reading of the foregoing description. The above-mentioned examples are provided to serve the purpose of clarifying the aspects of the invention and it will be apparent to one skilled in the art that they do not serve to limit the scope of the invention. All modifications and improvements have been deleted herein for the sake of conciseness and readability but are properly within the scope of the present invention.

The invention claimed is:

1. A system for dynamic marketing, comprising:
a client device, a server, and at least one addressable uniform resource indicator (URI), connected via a wireless communications network,
wherein the client device is operable to receive URI content from the server specified by the at least one addressable URI;
the client device including a graphical user interface (GUI) for displaying the URI content;
wherein the URI content is selected based on the current location of the client device;
wherein the URI content selected based on the current location of the client device improves targeting and response rates;
wherein the GUI includes feedback controls for obtaining feedback from a user while viewing the URI content, wherein the feedback controls are dynamically assigned and adjusted by the server based on criteria available to the server, and wherein the feedback controls are independent of the URI content;
wherein the server is operable to host a preference modeling software, a ratings database, and the at least one addressable URI.

2. The system of claim 1, wherein the client device is selected from a group consisting of mobile phone, cell phone, smart phone, computer, laptop, netbook, tablet, personal digital assistant (PDA), terminal, and any other client device suitable for wireless connection.

3. The system of claim 1, wherein the server is operable to receive the feedback through the GUI, store the feedback, track the URIs, and use ratings to create a preference model for suggesting additional URIs through the GUI; wherein the ratings are calculated from the feedback; and wherein the additional URIs suggested by the preference model are specific to the user.

4. The system of claim 3, wherein the preference model is a chimeric preference model created from a multiplicity of user ratings, wherein the multiplicity of user ratings are combined into a combined dataset, and wherein collisions between user ratings are resolved by:
- selecting one user rating for inclusion in the combined dataset and ignoring the rest of the user ratings;
- ignoring all colliding ratings;
- averaging colliding ratings; or
- hiding all content with colliding ratings.

5. The system of claim 1, wherein the system further comprises a points-based rewards program for giving reward points for taking a survey and providing feedback.

6. The system of claim 5, wherein accumulated reward points can be converted to coupons and other motivational devices.

7. The system of claim 6, wherein the coupons are associated with merchant-issued user IDs, wherein the merchant-issued user IDs are scannable codes on the coupons.

8. The system of claim 6, wherein a standard coupon is available to all users with a fixed amount of reward points.

9. The system of claim 6, wherein a bonus coupon or extra reward points depend upon the user's psychographic characteristics or social graph characteristics.

10. The system of claim 1, wherein the URI content comprises at least one of web content, images, videos, and motivational devices, wherein the motivational devices comprise brand content, promotional materials, and incentives.

11. The system of claim 1, wherein the URI content is selected based on current network limitations and the client device.

12. The system of claim 1, wherein the GUI includes channel selection control for selecting a content channel, wherein the content channel includes sponsored URI content by the content creators, libraries and distributors.

13. The system of claim 1, wherein the system is integrated with social networking systems; and wherein the GUI is operable for sharing the URI content via the social networking systems.

14. The system of claim 1, wherein the GUI is operable for activating a mood setting.

15. The system of claim 14, wherein the mood setting is operable for mood selection and mood creation.

16. The system of claim 15, wherein a selected or created mood is considered for suggesting the URI content.

17. The system of claim 15, wherein a mood is associated with rating metadata, wherein the rating metadata includes at least one of a client device type, location, time of day, day of week, month, season, and other similar metadata.

18. The system of claim 1, wherein the URI is operable for administering a survey regarding a brand or a product.

19. The system of claim 18, further comprising a survey administration application, wherein the survey administration application provides tools for market researchers, wherein the tools monitor the progress of the survey, adjust targeting criteria for surveys underway, review results of prior surveys, analyze prior surveys, create new surveys, target new surveys, and initiate new surveys.

20. The system of claim 1, wherein the feedback controls are buttons or sliders including true/false; like, no opinion, dislike; −2, −1, 0, +1, +2; A, B, C, D, E; 0 to 5 stars; Agree/Do not Agree; + and −; and combinations thereof.

* * * * *